(12) United States Patent
Shi

(10) Patent No.: US 10,666,584 B2
(45) Date of Patent: May 26, 2020

(54) METHOD AND SYSTEM FOR PROTECTING MESSENGER IDENTITY

(71) Applicant: Jiazheng Shi, Saratoga, CA (US)

(72) Inventor: Jiazheng Shi, Saratoga, CA (US)

(73) Assignee: Jiazheng Shi, Saratoga, CA (US)

( * ) Notice: Subject to any disclaimer, the term of this patent is extended or adjusted under 35 U.S.C. 154(b) by 0 days.

(21) Appl. No.: 16/153,750

(22) Filed: Oct. 6, 2018

(65) Prior Publication Data

US 2020/0112527 A1 Apr. 9, 2020

(51) Int. Cl.
*H04L 12/58* (2006.01)

(52) U.S. Cl.
CPC .............. *H04L 51/04* (2013.01); *H04L 51/10* (2013.01)

(58) Field of Classification Search
CPC ................................................. H04L 51/00–38
See application file for complete search history.

(56) References Cited

U.S. PATENT DOCUMENTS

| 5,812,670 | A * | 9/1998 | Micali | G06Q 20/0855 380/30 |
| 6,591,291 | B1 * | 7/2003 | Gabber | G06Q 10/107 370/393 |
| 7,231,427 | B1 * | 6/2007 | Du | H04L 51/28 709/206 |
| 9,294,425 | B1 * | 3/2016 | Son | H04L 51/18 |
| 9,906,479 | B1 * | 2/2018 | Son | H04L 51/18 |
| 10,356,021 | B2 * | 7/2019 | Quirarte | H04L 51/08 |
| 2003/0046144 | A1 * | 3/2003 | Clark | G06Q 50/34 705/12 |
| 2003/0131055 | A1 * | 7/2003 | Yashchin | G06Q 10/107 709/204 |
| 2004/0078216 | A1 * | 4/2004 | Toto | G16H 10/60 705/2 |
| 2005/0025300 | A1 * | 2/2005 | Lagadec | H04M 3/42008 379/201.11 |
| 2005/0076089 | A1 * | 4/2005 | Fonseca | H04L 12/1859 709/206 |
| 2005/0190924 | A1 * | 9/2005 | Marino | H04L 9/0827 380/286 |
| 2006/0281447 | A1 * | 12/2006 | Lewis | H04M 3/42042 455/418 |

(Continued)

*Primary Examiner* — David R Lazaro
*Assistant Examiner* — Julian Chang

(57) ABSTRACT

This invention discloses a method and apparatus for protecting message sender identity in an instant messaging system. Upon receiving an instant message via the instant messaging system, the system may withhold the identity of the sender while pushing the message to the other users in the communication channel. Identity withholding is controlled by the sender on his or her device. The disassociated message is displayed in a style that is common to users, for example, displaying in the middle, displaying in a common location, or even displaying in random locations on a screen of the message thread. Although someone can take a screenshot of a message, the screenshot does not contain any information that can be used to identify the actual sender of the message. In this case, users may generally rely on the context to appreciate the dynamics and/or flow of the conversation. The invention thus enables information sharing in an instant messaging system without the concern of screenshot.

16 Claims, 8 Drawing Sheets

(56) References Cited

U.S. PATENT DOCUMENTS

| | | | |
|---|---|---|---|
| 2008/0235336 A1* | 9/2008 | Stern | G06Q 10/107 709/206 |
| 2009/0042588 A1* | 2/2009 | Lottin | H04M 1/72552 455/466 |
| 2011/0151890 A1* | 6/2011 | Platt | G06Q 10/107 455/456.1 |
| 2011/0219423 A1* | 9/2011 | Aad | G06F 21/00 726/1 |
| 2013/0133050 A1* | 5/2013 | Emura | G06F 21/6254 726/6 |
| 2013/0138948 A1* | 5/2013 | Solotorevsky | H04L 12/1403 713/153 |
| 2014/0074565 A1* | 3/2014 | Green | G06Q 10/06398 705/7.42 |
| 2014/0141818 A1* | 5/2014 | Yoakum | H04L 51/26 455/466 |
| 2016/0034718 A1* | 2/2016 | Mizrachi | G06F 21/6263 726/28 |
| 2016/0294787 A1* | 10/2016 | Moore | H04L 51/24 |
| 2016/0359773 A1* | 12/2016 | Shi | H04L 51/04 |
| 2016/0359779 A1* | 12/2016 | Shi | H04L 51/046 |
| 2016/0379128 A1* | 12/2016 | Bouchard | H04W 4/21 706/12 |
| 2016/0380937 A1* | 12/2016 | Murphy | H04L 51/08 709/206 |
| 2017/0012917 A1* | 1/2017 | Yang | H04W 4/14 |
| 2017/0171131 A1* | 6/2017 | Steiner | H04L 51/22 |
| 2017/0171132 A1* | 6/2017 | Steiner | H04L 51/22 |
| 2017/0353416 A1* | 12/2017 | Brooks | H04L 51/16 |
| 2017/0353423 A1* | 12/2017 | Morrison | H04L 51/32 |
| 2018/0013714 A1* | 1/2018 | Leach | G06F 16/27 |
| 2018/0241871 A1* | 8/2018 | Sarafa | H04M 1/72552 |
| 2018/0278564 A1* | 9/2018 | Teixeira De Souza Filho | H04L 51/12 |
| 2018/0295092 A1* | 10/2018 | Peiris | H04L 51/32 |
| 2019/0102396 A1* | 4/2019 | Pan | H04W 12/02 |
| 2019/0190869 A1* | 6/2019 | Peiris | H04L 51/32 |
| 2019/0190870 A1* | 6/2019 | Peiris | H04L 51/32 |
| 2019/0190871 A1* | 6/2019 | Peiris | G06F 3/04842 |
| 2019/0190872 A1* | 6/2019 | Peiris | G06Q 50/01 |

* cited by examiner

METHOD AND SYSTEM FOR PROTECTING MESSENGER IDENTITY

CROSS-REFERENCE TO RELATED APPLICATIONS

This application is a continuation-in-part (CIP) application of U.S. patent application Ser. No. 14/878,177 filed Oct. 8, 2015, which is a continuation-in-part (CIP) application of U.S. patent application Ser. No. 14/864,865, filed Sep. 25, 2015, which claims priority to U.S. provisional patent application Ser. No. 62/170,137, filed Jun. 3, 2015, the contents of which are incorporated herein by reference in their entirety.

FIELD OF INVENTION

This invention generally relates to instant messaging. More specifically, this invention relates to processing and displaying instant messages.

BACKGROUND OF THE INVENTION

Instant messaging allows users to communicate with each other in real-time over wired or wireless networks. In the very beginning of the development of this technology, instant messaging only supported real-time text message exchanges. Today, more advanced instant messaging applications (a.k.a. instant messenger(s)) have added file transfer, clickable hyperlinks, Voice over IP, and/or video chat capabilities. With the development of mobile technologies, instant messaging via mobile devices (e.g., smartphones) are becoming the mainstream means for communications or sharing information between/among people.

Ephemeral messaging is the transmission of messages that automatically disappear from the recipient's screen after the message has been viewed. For example, a Snapchat® message can only be viewed once—during which the recipient must maintain contact with the touch screen of a device—and afterwards the message disappears from the screen.

However, present mobile-based instant messaging services generally require users to install an instant messaging application on their mobile devices before they can communicate with each other via the service. Particularly, ephemeral messaging requires users to install specific applications on their mobile devices. Because different people prefer different instant messaging services, a user often finds it necessary to install multiple instant messaging applications to keep in touch with others. It is particularly cumbersome when two users who do not share any ephemeral messaging service want to communicate with each other without leaving any trail or record, because they will first need to agree on an ephemeral messaging service, and then install the application for the service on their mobile devices before they can exchange ephemeral messages.

Furthermore, although present ephemeral messaging systems allow users to manually specify a particular ephemeral period for a message (i.e., the length of time a message may be displayed before it disappears), they do not have the capability of dynamically calculating an ephemeral period for a message based on the length, size, or content of the message.

As another drawback, present ephemeral messaging systems are prone to screenshot captures. For example, users can install special software on their devices to take screenshots of Snapchat® messages without notifying the message sender(s). Or, they can simply use a separate device to capture ephemeral messages. Although ContentGuard® application can prevent screenshot capturing in some degree, it uses optical illusions, which also block parts of the messages and cause some visual distraction problems.

In addition, although certain instant messaging systems provide read receipt functions, they achieved the functions by checking whether a message is delivered and displayed on a receiver's device. However, that's a less reliable indicator of whether the receiver has actually read the message. The message could be pushed off screen by new messages before the receiver had a chance to read it, or the receiver simply ignored it.

In addition, message identity protection is desired in many events involving conversation, for example, opinion surveys and price negotiations. Existing electronic messaging systems that rely on encryption methods to protect message content still display messenger identities on user devices, which may be captured by screenshot or other recording methods and cause leaks of a message sender.

Thus, there is a need for a new electronic communication system that can overcome the above shortcomings.

SUMMARY OF THE INVENTION

In one embodiment of the present invention, the electronic communication system is a web-based system. Upon registration with the system, a user receives a Universal Identifier ("UID") which uniquely identifies the user in the system. For example, the UID may be an internally generated identifier by the system or externally assigned identifiers such as a telephone number, an email address, social media user name, or an instant messenger ID. In addition, a smart Universal Resource Identifier ("URI") mechanism or link may be implemented to provide easy-to-access entry points to the system. In one embodiment, a URI may include a domain name followed by a UID. Domain names such as "hi.me," "talkto.me," "hi.us," and "talk.us," which sounds like an invitation for a conversation, may be used for creating URIs. For example, assuming Jack London's UID is "Jack-London," he can invite another person to communicate with him in the system by sending that person the URI "hi.me/Jack-London" via email, Short Message Service ("SMS"), or any instant messenger. By activating the URI (e.g., clicking the URI), the other person establishes a connection with the system, through which he/she can communicate with Jack London. Of course, the other person can actively initiate a conversation with Jack London by activating Jack London's URI. Furthermore, the system supports group conversation where more than two persons are included. It should be noted that the term "message" or "messages" used in this application could refer to text message(s) as well as multimedia message(s), such as video, audio, image, markup language (such as HTML, XML), or the combination of them.

In another embodiment of the present invention, the electronic communication system provides a user an option to switch to ephemeral-messaging mode and an option to switch back to normal-messaging mode during a conversation with others, thus allowing the user to control the ephemeralness of his/her own messages on an individual basis. Furthermore, during ephemeral messaging, the electronic communication system may disassociate a message from the actual sender and/or receiver of the message. Thus, even if the message is intercepted or the display screen is captured, there is no record to establish the identity of the user who sent or received the message. In this case, users may generally rely on the context to appreciate the dynamics and/or flow of the conversation.

In yet another embodiment of the present invention, if a user sends a message under ephemeral-messaging mode, the electronic communication system automatically determines the length of time to display the message before removing the message from a mobile device's screen based on the length, size, or content of the message or based on user preference, experience, or interest. The message may slowly fade away or disappear from a screen abruptly. Alternatively, a final countdown/up may be added to warn a user that the message will disappear soon.

In yet another embodiment of the present invention, the electronic communication system may provide a customized client-side application.

In yet another embodiment, the electronic communication system may use possession and/or inherence factors to authenticate users. For example, the electronic communication system may store a user's inherence factor (such as a portrait photo, a voice record, or a video clip) or possession factor (such as a unique object or a pet). When enhanced security or privacy is required, the electronic communication system requests the user to take a photo shot, speak a word or sentence, or answer a question (e.g., pet's name) and matches the user's input with the stored inherence or possession factor.

The present invention also discloses a method and apparatus for providing reliable read receipts for instant messages communicated in an electronic communication system. In one embodiment, upon receiving an instant message, a user device (e.g., personal computer, smartphone, etc.) first displays a notification message or redacted version of the instant message instead of the instant message. The notification message or redacted message contains visual cues that invite a user to click, tap, or swipe on it to view the full content of the instant message. Upon receiving the responsive user action, the user device replaces the notification message or redacted message with the full instant message on the display. And immediately after that, the user device sends a confirmation signal to the electronic communication system to indicate that a user has read the instant message. The electronic communication system may then send a read receipt to the sender of the instant message. Furthermore, if the instant message is an ephemeral message, the user device will stop displaying the instant message after its ephemeral period has passed since receiving the user action.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the leftmost digit of a reference number identifies the drawing in which the reference number first appears.

DETAILED DESCRIPTION

Figure 1:
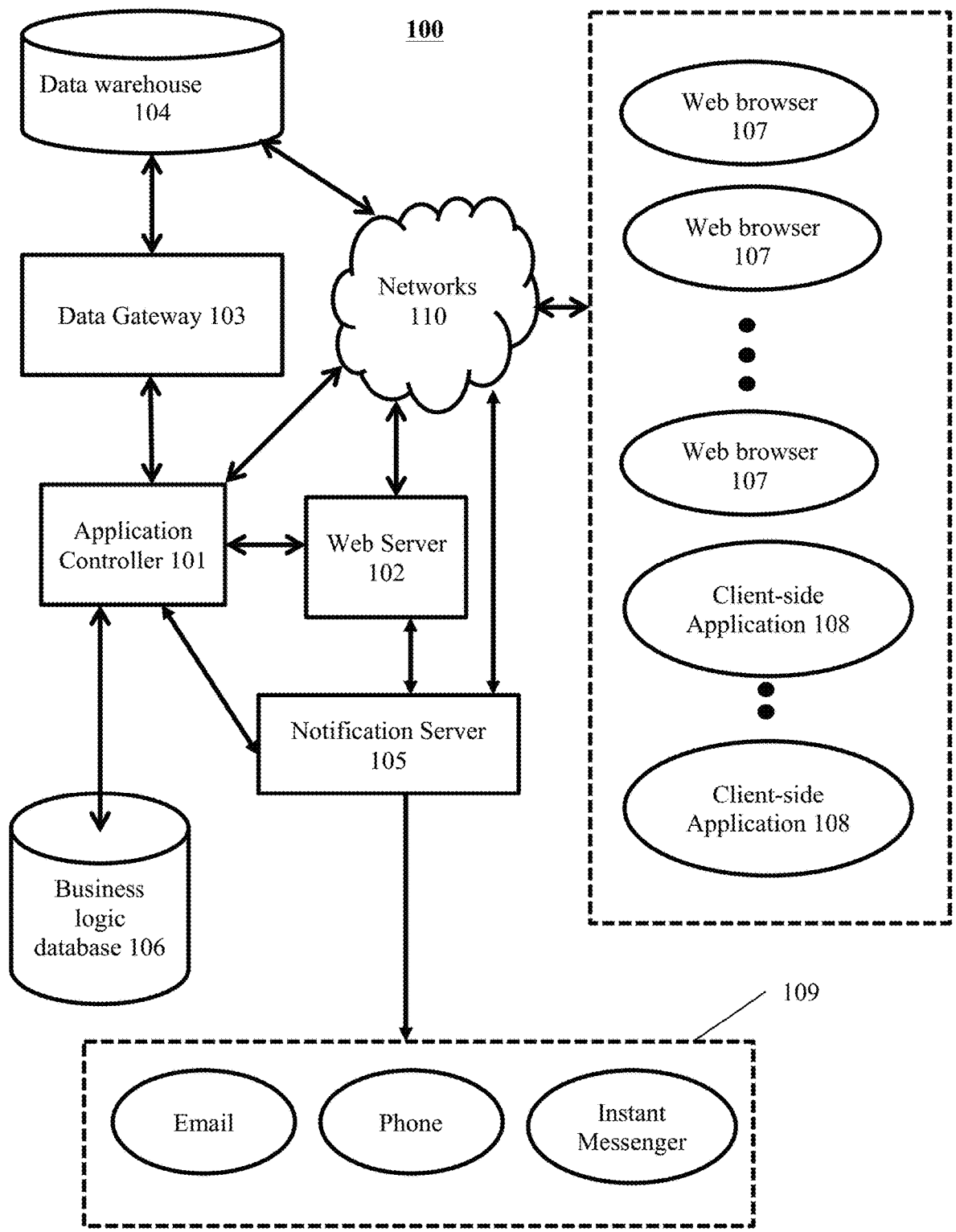
FIG. 1 is a system diagram illustrating the electronic communication system, according to some embodiments of the present invention.

FIG. 1 is a system diagram illustrating an electronic communication system. In one embodiment, the electronic communication system 100 (or "System") includes an application controller 101, a web server 102, a data gateway 103, a data warehouse 104, a notification server 105, and a business logic database 106. The application controller 101 can communicate with one or more web browsers 107 through the web server 102 or directly communicate with one or more client-side applications 108 via wired or wireless networks 110, thus providing a platform for users to communicate with each other. For example, upon receiving a request, from a first user at a web browser 107 or client-side application 108, to start a conversation with a second user, the application controller 101 causes the notification server 105 to push a notification message to the second user. If the second user has logged into the System from one of the web browsers 107 and client-side applications 108, the notification server 105 pushes the notification message to the particular web browser 107 or client-side application 108 via the wired or wireless networks 110. In case the second user is at a web browser 107, the notification message is pushed through the web server 102. However, if the second user has logged off the System, the notification server 105 may push a notification message to the second user via email, phone, SMS, and/or instant messaging. If the second user accepts the first user's request, the application controller 101 establishes a communication channel between the two users, through which they can exchange messages. In one embodiment, the communication channel includes a first connection between the first user's web browser 107 or client-side application 108 and the System and a second connection between the second user's web browser 107 or client-side application 108 and the System. Of course, more users can be added to the communication channel through the same process. In that case, the communication channel would include additional connection(s) between the additional web browser(s) or client-side application(s) and the System. The web browsers 107 and client-side applications 108 may operate on one or more user devices, such as personal computers, mobile phones, smartphones, smartwatches, PDAs, tablet computers, which generally include a display (such as a touchscreen display), a memory for storing data and instructions, and a processor for executing programs or applications.

In addition, the System may implement possession and/or inherence factor authentication as an additional security measure. For example, when a new user registers with the System or after the registration process, the System may ask the user if a higher level security is needed. If the user answers yes, the user is then requested to upload data known as possession and/or inherence factors that may be used to further authenticate the user. Such data may include, but is not limited to, the user's voice record, photo, signature, etc. The System will process, categorize, and store these possession and inherence factors together with the user's profile in the System.

Before exchanging messages, a sender can first request a receiver to provide an authentication factor (e.g., a headshot, a voice record). The System can send such request automatically on behalf of the sender. After the System receives the authentication factor, the System may simply forward it to the sender for peer authentication. Alternatively, the System may process and verify the factor automatically and forward the result of authentication to the sender. In one embodiment, in order to ensure that the authentication factor sent by the receiver is not a prerecorded one, the System or the sender can provide a word, number, symbol, or sentence instantaneously, and ask the receiver to read and record it as the authentication factor. For example, the System or the sender can pick up a random code, the receiver is required to read the code and record the reading. The System can extract the voice from the recording and matches the voice with the receiver's inherence factor already stored in the System. Alternatively, the System forwards the recording to the sender for peer authentication.

The business logic database 106 may store user information, including but not limited to their UIDs, password, names, phone numbers, instant messenger IDs, emails, possession and inherence factors, preferences, experiences, interests, etc. In the above example, upon receiving the request from the first user, the application controller 101 can look up the business logic database 106 to find the UID and other information of the second user. Furthermore, the application controller 101 can maintain a lookup table to keep track of all the users who have logged into the System and the connections through which the users are communicating with the System via the various web browsers 107 and/or client-side applications 108.

After a communication channel is established, users on the same communication channel can exchange messages. Particularly, upon receiving a message from a user at a web browser 107 or client-side application 108, the application controller 101 forwards the message or a reference to the message to the data gateway 103, which may encrypt and/or compress the message before storing it in the data warehouse 104. If necessary, the data gateway 103 can also convert the data format of the message before the encryption and/or compression operation. The application controller 101 then pushes the message to the web browser(s) 107 (through the web server 102) or client-side application(s) 108 operated by other users on the communication channel.

The application controller 101 may calculate the "ephemeral period" of a message (i.e., the length of time a message may be displayed before it disappears) based on the length, size, or content of the message or based on user preference, reading experience, or interest. For example, the ephemeral period of a text message may be a function of the length or size of the text message—the longer or larger a text message is, the longer it can "live" because a reader may need more time to read it. On the other hand, text messages containing frequently used greeting words or phrases (e.g., "hello," "how are you," etc.) may have shorter ephemeral period because they are less likely to contain important information and readers can glimpse them very quickly.

The application controller 101 may also apply natural language processing (NLP) methods to compute the entropy of a text message, i.e., the expected value of the information contained in the message, or the entropy of part of the message (e.g., words or phrases) and use the entropy to calculate the ephemeral period of the message.

It should be noted that the application controller 101, web server 102, data gateway 103, data warehouse 104, notification server 105, and business logic database 106 can operate or be implemented on a single server computer or multiple server computers. Also, the System can have multiple application controllers 101, web servers 102, data gateways 103, data warehouses 104, notification servers 105, and/or business logic databases 106 to increase its computing or servicing power. Furthermore, certain modules can be combined into one module. For example, the notification server 105 can be combined with the application controller 101 so that the combined module will serve the functions of both the application controller 101 and the notification server 105.

Figure 2:
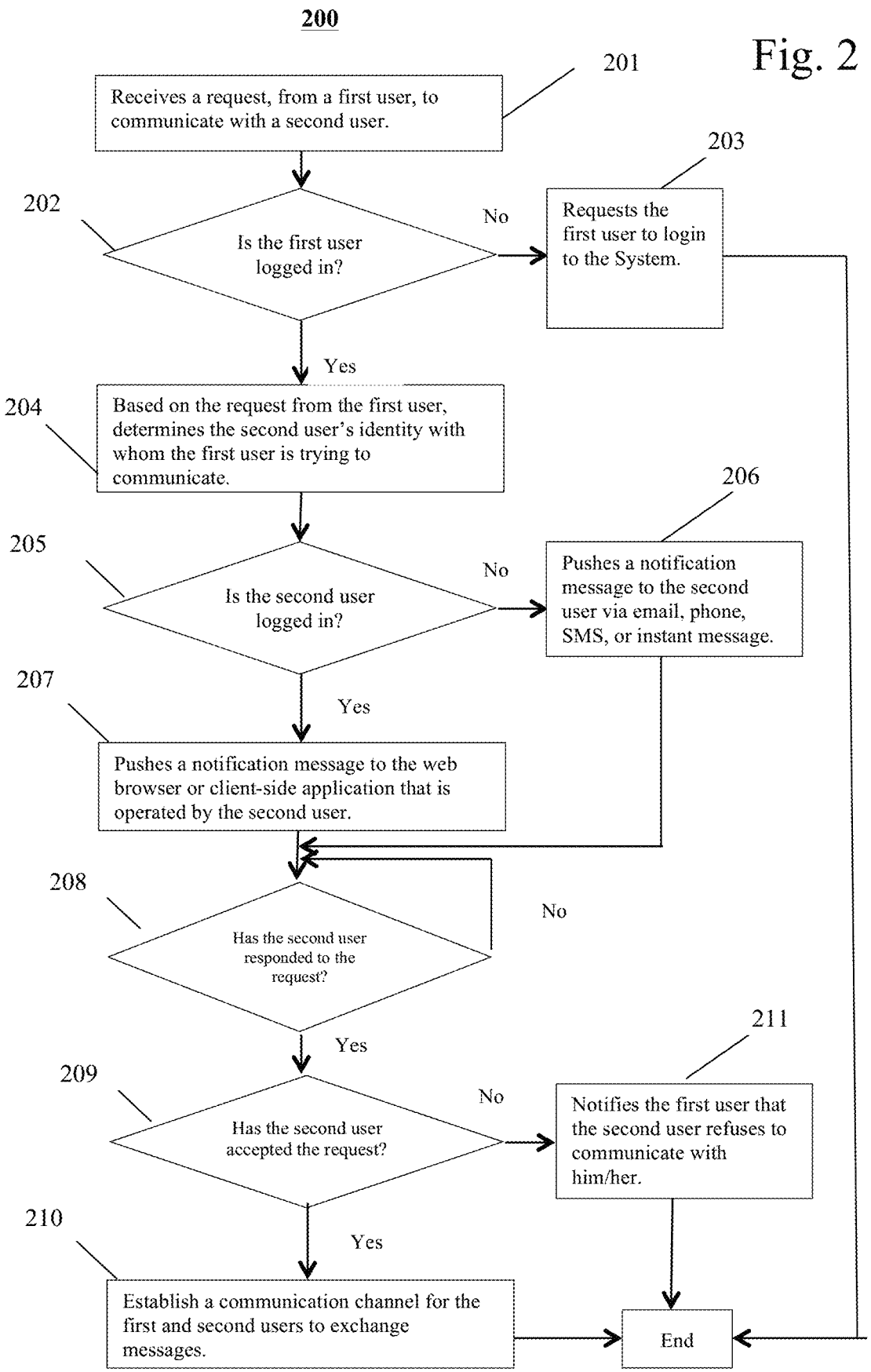
FIG. 2 is a flow diagram illustrating a process of establishing a communication channel for users to exchange messages, according to some embodiments of the present invention.

FIG. 2 is a flow diagram illustrating a process 200 of establishing a communication channel for users to exchange messages. In one embodiment, the process 200 is executed by the application controller 101 of the System. And there can be multiple instances of the process 200 running simultaneously at any time to process multiple requests.

At step 201, the process 200 receives a request, from a first user, to communicate with a second user. This request may be generated when the first user clicks a URI associated with or assigned to the second user. In one embodiment, a URI may include a domain name followed by a UID. Domain names such as "hi.me," "talkto.me," "hi.us," and "talk.us," which sounds like an invitation for a conversation, may be used for creating URIs. For example, assuming Jack London's UID is "Jack-London," he can invite another person to communicate with him in the System by sending that person the URI "hi.me/Jack-London" via email, Short Message Service ("SMS"), or instant messenger. Also, a URI may further followed by a thread ID to identify a communication thread. For example, Jack can create a thread called "lunch meeting" under his account. Assuming lunch-meeting-001 is the thread ID for this thread. He can use "hi.me/Jack-London/lunch-meeting-001" to invite that person to communicate with him via the lunch-meeting thread. Of course, Jack can create another thread to invite another person to communicate with him via the System. Thus, like Jack, a user can initiate new communications with different people by creating new threads.

At step 202, the process 200 checks whether the first user is currently logged into the System. If the process 200 determines that the first user is not logged into the System, the process 200 goes to step 203. Otherwise, the process 200 goes to step 204.

At step 203, the process 200 requests the first user to log into the System. If the first user has registered with the System, he/she can login by providing the UID and password. Alternatively, the first user can provide a mobile phone number, to which the System can send a temporary passcode for the first user to login. Alternatively, the System can create a guest login account for the first user and grant the account limited resource access permission (e.g., permission to communicate with the second user only). The System can save the guest login information in the first user's web browser or client-side application (as cookies, for example, or other data forms) to support the first user's messaging usage. In addition, the System may convert the guest account into a regular account upon the first user's decision to register with the System. The first user's old messages communicated before the conversion may also be recovered or preserved. In one embodiment, the process 200 ends after step 203. Once the first user has logged in, from a web browser 107 or a client-side application 108, the web browser or client-side application can resend the request again to the System, and another instance of the process 200 will start from step 201 again. Alternatively, the process 200 goes back to step 202 to check again whether the first user has logged in.

At step 204, the process 200 determines the identity of the second user with whom the first user is trying to communicate, based on the request from the first user. For example, the process 200 can figure out the UID from the URI included as part of the first user's request. Then, the process 200 can look up the UID in the business logic database 106 to figure out the second user's name, phone number, email, etc.

At step 205, the process 200 determines whether the second user is currently logged into the System. If the second user is logged into the System, the process 200 goes to step 207. Otherwise, the process 200 goes to step 206.

At step 206, the process 200 pushes a notification message to the second user via email, phone, SMS, or instant message. The notification message may inform the second user that the first user wants to communicate with him/her. The notification message may provide a link that directs the first user to log into the System and communicate with the first user. Afterwards, the process 200 goes to step 208.

At step 207, the process 200 pushes a notification message to the web browser 107 or client-side application 108 that is operated by the second user. Afterwards, the process 200 goes to step 208.

At step 208, the process 200 determines whether the second user has responded to the request. If yes, the process 200 goes to step 209. Otherwise, the process 200 goes back to 208. Alternatively, the process 200 goes into a sleep mode and waits until the second user responds to the request.

At step 209, the process 200 determines whether the second user accepted or rejected the first user's request. If the second user accepted the request, the process 200 goes to step 210. If the second user rejected the request, the process 200 goes to step 211.

At step 210, the process 200 establishes a communication channel for the first and second users to exchange messages. Afterwards, the process 200 ends.

At step 211, the process 200 notifies the first user that the second user refuses to communicate with him/her, and then ends. Alternatively, the process 200 may choose not to notify the second user if the first user or the System is set to ignore specific messages or users.

In another embodiment of the process 200, the second user may ask the first user to authenticate his/her identity by providing a voice verification message before accepting the first user's request for communication. The process 200 then prompts an option (e.g., a push button) to the first user and asks the first user to record a short audio message by choosing the option (e.g., pushing the button while recording). Afterwards, the process 200 sends the audio message to the second user and provides the second user an option to listen to the audio message and ultimately accept or reject the first user's request.

Figure 3:
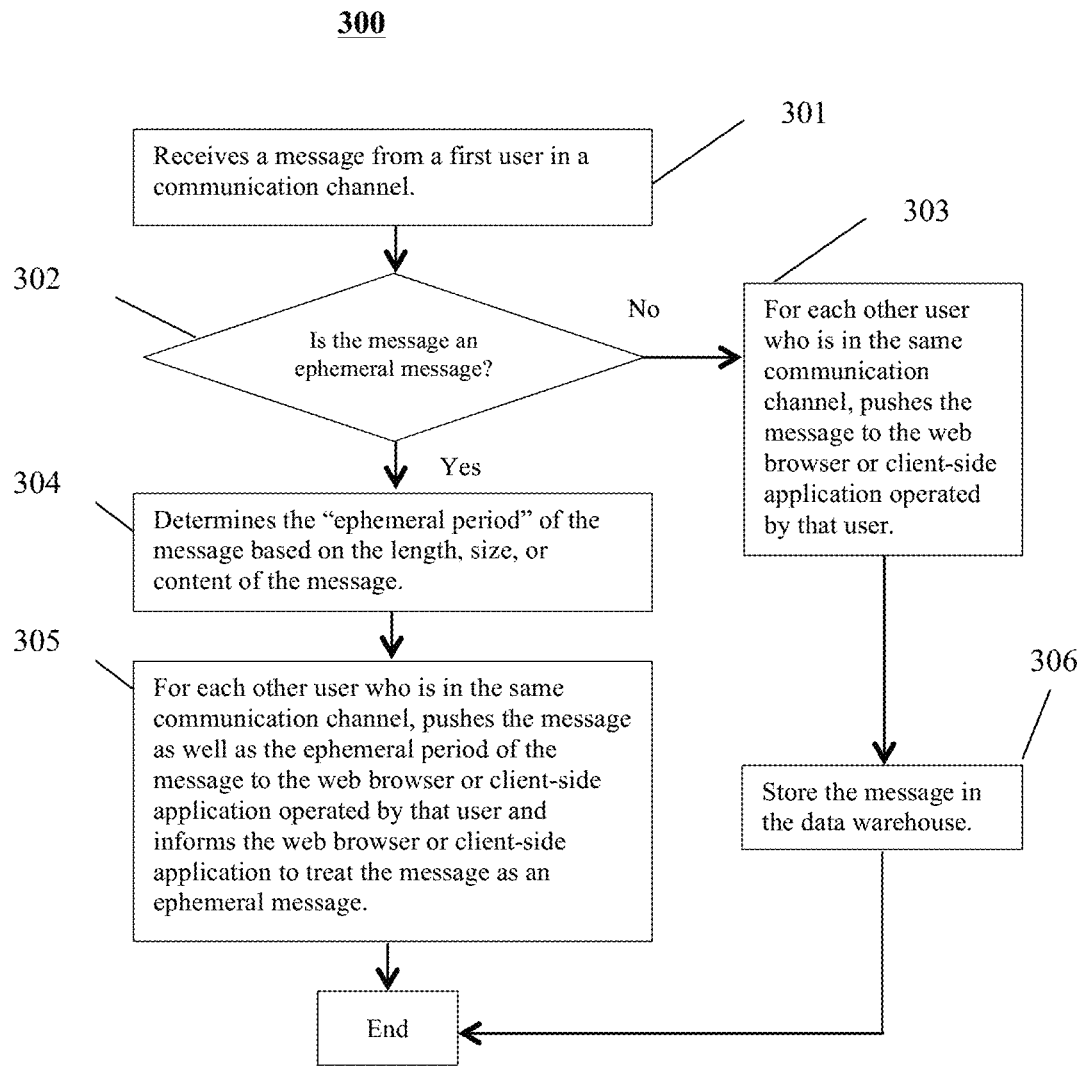
FIG. 3 is a flow diagram illustrating a process of transmitting messages between or among users via a communication channel, according to some embodiments of the present invention.

FIG. 3 is a flow diagram illustrating a process 300 of transmitting messages between or among users via a communication channel. In one embodiment, the process 300 is executed by the application controller 100 of the System. And multiple instances of the process 300 may be running at any given time. It is assumed that a communication channel has already been established for two or more users by process 200.

At step 301, the process 300 receives a message from a first user in a communication channel.

At step 302, the process 300 determines whether the message is an ephemeral message. If the message is an ephemeral message, the process 300 goes to step 304. Otherwise, the process 300 goes to step 303. In one embodiment, a user who is sending a message has total control over whether the message should be treated as an ephemeral message. The software program running on a web browser 107 or client-side application 108, which communicates with the System and is operated by the user, provides an option for the user to switch to ephemeral messaging mode, and any message sent under the ephemeral messaging mode will be treated by the System as ephemeral message.

At step 303, for each other user in the same communication channel, the process 300 pushes the message to the web browser or client-side application operated by that user. In one embodiment, the process 300 may withhold the identity of the first user while pushing the message so that other user(s) in the channel does not know who sent the message—a way of achieving anonymity during communication because even someone takes a screenshot of the message the screenshot does not contain any information that can be used to identify the actual sender of the message. In this case, users may generally reply on the context to appreciate the dynamics and/or flow of the conversation. For example, if the channel has only two users, the users know who the actual sender is, but the screenshot does not disclose any identity information about the actual sender. Afterwards, the process 300 goes to step 306, where it stores the message in the data warehouse 104 through the data gateway 103. And after step 306, the process 300 ends.

At step 304, the process 300 determines the "ephemeral period" of the message based on the length, size, or content of the message, or based on user preference, experience, or interest. For example, the ephemeral period of a message may be a function of the length and/or size of the message. The longer/larger the message is, the longer its ephemeral period is. For example, let N be the number of characters in a message. The ephemeral period P of the message may be equal to W*N, where W can be time unit, e.g., 200 ms. Other linear or nonlinear functions may be applied too. The System may also assign different time unit to digital numbers and special characters.

Furthermore, the ephemeral period of a message may be determined based on the content of the message. For example, in case the message is an image or a video clip, the process 300 may use existing image classification method to determine a quantitative or qualitative value of the likelihood that the image or video clip contains any indecency content (e.g., nudity, pornography). Based on the calculated value, the process 300 may specify an ephemeral period to the message—the higher the value is (which means that the message is more likely to contain indecency material) the shorter the ephemeral period is specified. Furthermore, the process 300 can use computer vision methods such as face recognition to locate face or other private body parts to automatically blur or remove the area(s) in the image or video clip. The process 300 may also analyze sentiment and social meaning such as anger and happiness of a given image and use the result as a factor in the determination of ephemeral period of a message. Similarly, the process 300 can use voice recognition method to process a voice message to detect the indecency word and use the result to determine the ephemeral period of the message. In case the message is a text message, the process 300 may call process 400, which is discussed in detail below, to determine the ephemeral period of the message based on the content of the message.

Of course, the ephemeral period of a message may be determined based on a user's preference, experience, or interest. Regarding user preference, a user may manually specify the ephemeral period of a message he/she is about to send. For example, the System may provide some preset options (e.g., 10 seconds, 1 minute, etc.) for the user to select. User experience and interest may also be used as factors in determining the ephemeral period of a message. For example, if a user frequently complains that the ephemeral period of a message is too short for him/her to finish reading it, the System may incrementally increase the ephemeral period generally to improve user experience. As another example, if a user is interested in sports, the System may adjust the function for calculating the ephemeral period if a message contains sports related information.

At step 305, for each other user in the same communication channel, the process 300 pushes the message as well as the ephemeral period of the message to the web browser or client-side application operated by that user and informs the web browser or client-side application to treat the message as an ephemeral message. Similar to step 303, as an option, the process 300 may withhold the identity of the first user while pushing the message so that he/she may keep anonymous during communication. Afterwards, the process 300 ends.

Figure 4:
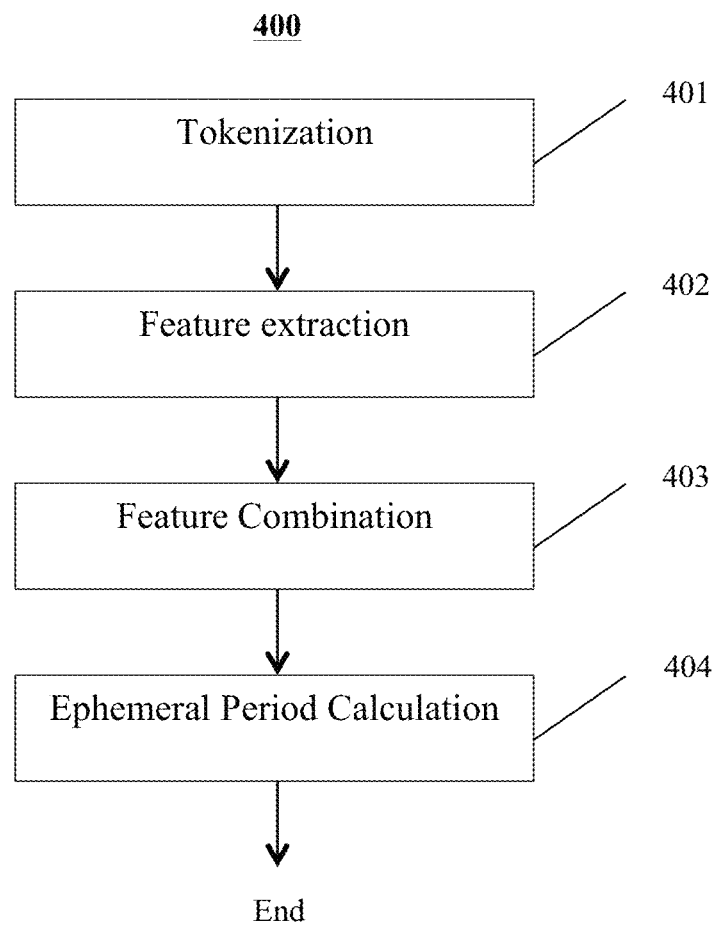
FIG. 4 is a flow diagram illustrating a process of calculating the ephemeral period of a message, according to some embodiments of the present invention.

FIG. 4 is a flow diagram illustrating a process 400 of calculating the ephemeral period of a message. In one embodiment, the process 400 is executed by the application controller 101. The process 400 includes four major steps: tokenization (401), feature extraction (402), feature combination (403), and ephemeral period calculation (404).

At step 401 (tokenization), the process 400 breaks a text message into one or more tokens. A token can be a word or phrase. In one embodiment, the process 400 may use existing tokenization tools, such as Apache's OpenNLP™, for the tokenization task. Alternatively, the process 400 can tokenize a text message by detecting whitespace and punctuation marks.

At step 402 (feature extraction), the process 400 calculates various features for each token. These features include, but are not limited to, intra-token feature, inter-token feature, extra-token feature, and tagged-token feature.

The intra-token feature $F_{intra}$ of a token measures the significance or importance of the token in and of itself. It is determined by the token itself and is independent of the context where the token appears. In one embodiment, the $F_{intra}$ value of a token is a function (e.g., aggregation) of the entropies of all letters in the token:

$$x=f(h_1, \ldots, h_n), i \in \{1, \ldots, n\},$$

where $h_i$ is the entropy of the token's $i^{th}$ letter, assuming there are n letters in the token, and f(.) can be any function, including, but not limited to, summation or weighted summation. Entropy measures information in content as a function of the amount of uncertainty as to what is in the content. Mathematically, entropy h can be formulated as follows:

$$h=-E\{\log(p)\}$$

where p stands for the probability of outcome and E{.} stands for statistical expectation. The entropy of a letter ("a," "b," etc.) may be predetermined based on the type of a natural language (English, Dutch, etc.) or calculated dynamically based on the information exchanged between or among users. Once determined, the $F_{intra}$ value can be normalized to be [0, 1] as follows:

$$x_{0,1} = \frac{x - x_{min}}{x_{max} - x_{min}},$$

where $x_{max}$ and $x_{min}$ are the max and min values of this feature in the content. Also, the value can be normalized statistically to have the Normal distribution N(0,1) as follows:

$$x_{0,1} = \frac{x - \underline{x}}{\sigma},$$

where $\underline{x}$ and $\sigma$ are the mean and standard deviation, respectively. Methods such as thresholding by percentiles, e.g., 5% and 95% percentile as the min and max values, can help avoid outliers. Furthermore, certain information (e.g., social security number, government ID number, bank/credit card account number) may be detected based on preset format (e.g., 9-digit with dashes for SSN, 16-digit for credit card) and may be given higher $F_{intra}$ value.

The inter-token feature $F_{inter}$ of a token measures the significance or importance of the token within a particular context. The $F_{inter}$ value may be determined based on an objective factor and/or a subjective factor. The objective factor may be computed by keyword selection algorithms, such as Apache's OpenNLP™ Speech Tagger, Text Chunker, and Name Finder. The process 400 can use the analysis result(s) (e.g., likelihood of importance of a token) from the keyword selection algorithms to compute the objective factor for the $F_{inter}$ value. The subjective factor may be computed by using existing algorithms (such as the ones developed by Stanford Natural Language Processing Group) to analyze and extract sentiment of the token. A token having polite, positive sentiment may have a large score, whereas a token having negative sentiment may have a low score. Specifically, let $p_o$ and $p_s$ be the objective and subjective factors of the token x, the token's $F_{inter}$ value may be characterized as follows:

$$F_{inter}=f(p_o, p_s) \text{ where } 0 \leq p_o, p_s \leq 1$$

$f(p_o, p_s)$ can be a linear combination, such as $F_{inter}=0.5*p_o+0.5*p_s$. Alternatively, it may be a nonlinear function or even a trained neural network or other computational approaches.

The extra-token feature $F_{extra}$ of a token measures the significance or importance of the token in terms of general public interest. In one embodiment, the System maintains a list of such tokens (e.g., political topics, taboo expressions, popular search words) in a lookup table. If a token is in this list, the $F_{extra}$ value of the token may be 1. Otherwise, the $F_{extra}$ value of the token may be 0. In another embodiment, the $F_{extra}$ value of a token can be determined in terms of popularity, sensitivity, or other ranking factors. For example, the System can maintain the order of entries adaptively to reflect the trend in social media. The System can normalize the rank to quantitative value in [0,1]. For example, let N be the total number of entries in the table and r be the rank of a given token:

$$F_{extra} = \frac{N-r}{N-1}, \quad r \in \{1, \ldots, N\}$$

If the token is the on the top (r=1), $F_{extra}$=1.0 while the last one has $F_{extra}$=0. Other linear or nonlinear formula may be used for measuring the score. For example, the System may impose minimal score to $F_{extra}$ instead of using 0.

The tagged-token feature $F_{tagged}$ of a token concerns whether the token has any significance to a particular user. For example, a user can tag a token to indicate that the tagged token is significant to him/her in some respect. In one embodiment, the System maintains a list of such tagged tokens. The $F_{tagged}$ value of a token may be 1 or 0. A value of 1 indicates that the token belongs to the list of tagged tokens. A value of 0 indicates that the token is not tagged. In another embodiment, the $F_{tagged}$ value of a token may be determined by ranking, such as the one used for determining $F_{extra}$.

At step 403 (feature combination), the process 400 initializes weight for each feature. In one embodiment, the process 400 uses the same weight for all selected features. Alternatively, a user may customize these weights based on his/her own preference. For example, a stock trader may give a relatively heavier weight to tagged-token feature for tokens related to stock prices, indices, and earnings. A feature may have a zero weight if the feature is not considered. After initialization or customization, the weights can be further optimized based on user experience or other metrics.

Prior linguistic and existing knowledge regarding natural languages (e.g., English, Dutch, Chinese) may be used to initialize certain parameters of the algorithms mentioned above, such as the OpenNLP™ algorithms. The process 400 may be optimized in terms of various performance metrics. For example, the process 400 may be optimized to achieve a certain level of monthly active user (MAU) rate. A performance metric can be a subjective value quantified based on the evaluation of user feedback, such as survey results or user preference. The feature combination step may be optimized based on active learning or other semi-supervised learning methods. And AB testing or cross-validation may be used to validate the optimization.

The process 400 may apply various regression methods or modeling paradigms to combine these features. For example, the process 400 may apply the following logistic regression function for a given performance metric (PM):

$$PM = \frac{e^{\alpha_0 + \alpha_1 * f(F_{intra}) + \alpha_2 * f(F_{inter}) + \alpha_3 * f(F_{extra}) + \alpha_4 * f(F_{tagged})}}{1 + e^{\alpha_0 + \alpha_1 * f(F_{intra}) + \alpha_2 * f(F_{inter}) + \alpha_3 * f(F_{extra}) + \alpha_4 * f(F_{tagged})}}$$

where f(.) is a function that aggregates all values of the given features in the content, $\alpha_i$, i={0, 1, 2, 3, 4} are weights. Here, f(.) may be mean, median, or other aggregation functions. In one embodiment, the process 400 can be trained with a large dataset so that the weights $\alpha_i$, i={0, 1, 2, 3, 4}, can be adjusted towards better user experience.

With the optimized weights, a token's score is calculated as follows:

$$T = \frac{e^{\alpha_0 + \alpha_1 * F_{intra} + \alpha_2 F_{inter} + \alpha_3 * F_{extra} + \alpha_4 * F_{tagged}}}{1 + e^{\alpha_0 + \alpha_1 * F_{intra} + \alpha_2 F_{inter} + \alpha_3 * F_{extra} + \alpha_4 * F_{tagged}}}$$

The score has a range of [0, 1]. Let $t_i^1, \ldots, t_i^n$ be scores of n tokens in a message i, the score for message i can be computed by function:

$$s_i = f(t_i^1, \ldots, t_i^n),$$

where f(.) can be max, mean, media, or other aggregation functions. Again, the calculated score for message i can be normalized to the range of [0, 1].

At step 404, the process 400 calculates the ephemeral period for the message based on the message's score. For example, the ephemeral period for a message can be a function of the message's score. The higher the message's score, the longer the message's ephemeral period is. Of course, other types of functions may be used for such calculation. And the selected function(s) may be further adjusted to adapt to a particular user's using experience.

The process 400 can run solely on the server side, or on the client side, or work together from both sides. Furthermore, instead of making a whole message ephemeral, the process 400 can select one or more particular tokens from the message and calculate an ephemeral period for the selected token(s). In that case, rather than removing the whole message from a display, as discussed in relation to FIG. 5 below, only the selected tokens will be removed or redacted from the display.

Figure 5:
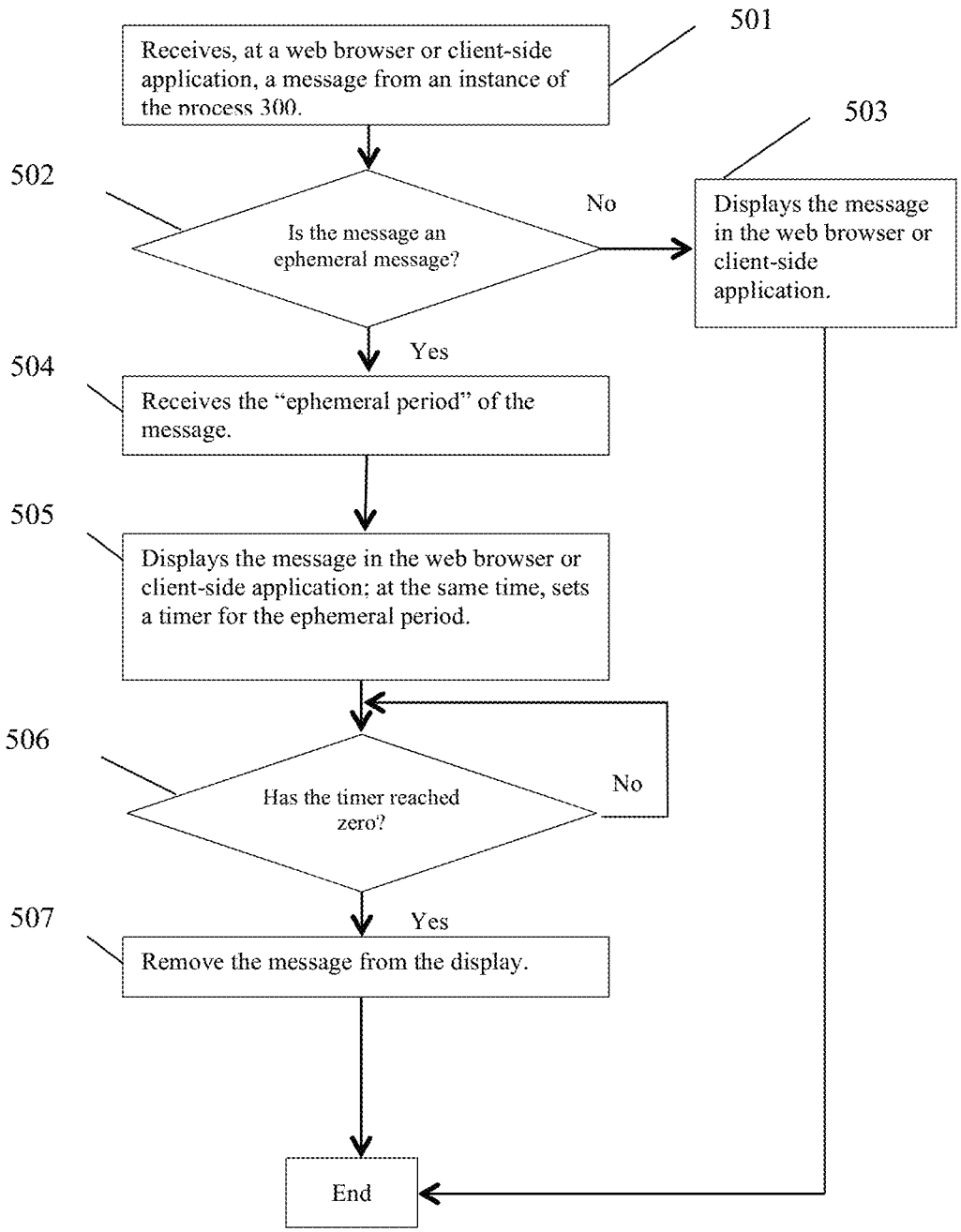
FIG. 5 is a flow diagram illustrating a process of handling ephemeral messages, according to some embodiments of the present invention.

FIG. 5 is a flow diagram illustrating a process 500 of handling ephemeral messages at a web browser 107 or client-side application 108. There can be multiple instances of the process 500 running simultaneously at any given time on any given web browser 107 or client-side application 108. In the case of a web browser, the program instructions for the process 500 may be transferred to the web browser from the System when a user visits a website of the System. In the case of a client-side application, the program instructions for the process 500 is included as part of the application, which is downloaded onto a mobile device by a user.

At step 501, the process 500 receives, at a web browser or client-side application, a message from an instance of the process 300. As illustrated with respect to step 303 and 305 of the process 300, this message may originate from another user in a communication channel.

At step 502, the process 500 determines whether the message is an ephemeral message. If the message is ephemeral, the process 500 goes to step 504. Otherwise, the process 500 goes to step 503.

Figure 8A:
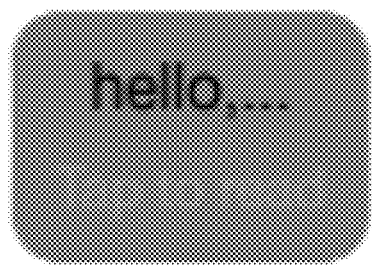
FIG. 8A shows a redacted text message which invites a user to tap on it to read the whole message, according to some embodiments of the present invention.

At step 503, the process 500 displays the message in the web browser or client-side application. In a different embodiment, instead of the message, a dummy message is displayed in the web browser or client-side application. For example, the dummy message may be a notification message. The notification message may be highlighted in a color that's different from other messages and use visual cues, such as text or image, to inform the user of the web browser or client-side application to click or tap on it on the display to view the message. Other user actions such as double clicking, double tapping, and finger swiping may be applied instead. Alternatively, the dummy message could be a redacted version of the message. For example, if the message is a text message, only the first word may be shown to the user. FIG. 8A shows such an example. Or, the process 500 may use a process similar to process 400 to select one or more particular tokens from the message for redaction.

Figure 8B:
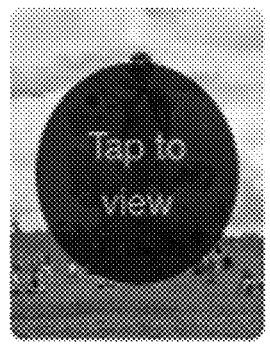
FIG. 8B shows a redacted image which invites a user to tap on it to view the whole image, according to some embodiments of the present invention.

The redacted message may also include a label asking the user to click, tap, or swipe on it to read the full message. As another example, if the message is a photo, redaction may be achieved by showing a big black circle in the middle of the photo, which contains a visual cue such as a label asking the user to click, tap, or swipe on it to view the whole photo. FIG. 8B shows such an example. Once the user clicks, taps, or swipes on the notification message or the redacted message, the process 500 displays the message. In addition, the process 500 may send a confirmation signal to the System to indicate that the user has read the message. And the System may send a read receipt to the sender of the message.

At step 504, the process 500 also receives the "ephemeral period" of the message and goes to step 505.

At step 505, the process 500 displays the message in the web browser or client-side application. At the same time or substantially the same time, the process 500 sets a timer for the ephemeral period. Similarly, as described in step 503, a notification message or redacted version of the message may be displayed in the web browser or client-side application instead. When the user clicks or taps on the notification message, the process 500 displays the message and starts a timer for the ephemeral period. In addition, the process 500 may send a confirmation signal to the System to indicate that the user has read the message.

At step 506, the process 500 determines whether the timer expires (e.g., reaches zero). If not, the process 500 returns to 506 to check again until the timer expires. If the timer expires, the process 500 goes to step 507. Meanwhile, the message may dim out of the screen gradually.

At step 507, the process 500 removes the message from the display. In one embodiment, the process 500 removes the message without any warning to the user. Alternatively, the message may slowly fade away from the display or the process 500 starts a countdown to warn the user. Afterwards, the process 500 ends.

Figure 6:
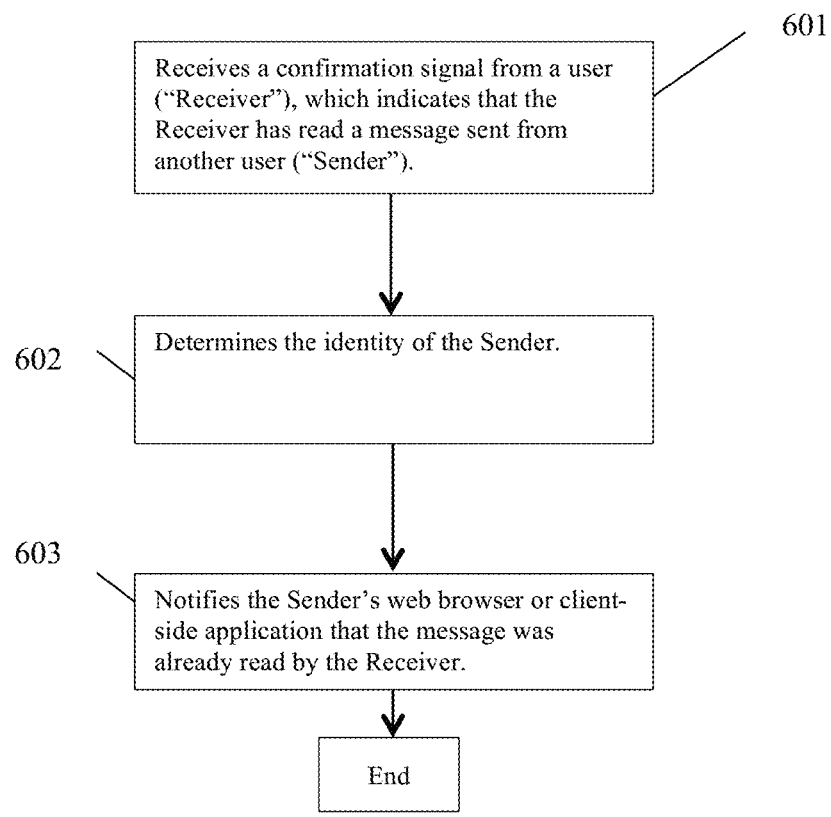
FIG. 6 is a flow diagram illustrating a process of handling confirmation signal(s) between or among users via a communication channel, according to some embodiments of the present invention.

FIG. 6 is a flow diagram illustrating a process 600 of handling confirmation signal(s). In one embodiment, the process 600 is executed by the application controller 100 of the System. And multiple instances of the process 600 may be running at any given time. It is assumed that a communication channel has already been established for a plurality of users by process 200 and one of the users (the "Sender") has sent a message to the other user(s) (the "Receiver(s)") in the channel. It is also assumed that one Receiver (the "Confirming Receiver") has read the message by clicking or tapping on a notification message or a redacted version of the message, as described above in discussion of process 500. And a confirmation signal was sent to the System.

At step 601, the process 600 receives a confirmation signal from the Confirming Receiver, which indicates that the Confirming Receiver has read a message sent from the Sender. The confirmation signal contains a reference to the message sent from the Sender. In one embodiment, the reference is the message's unique ID assigned by the System.

At step 602, the process 600 determines the identity of the Sender based on the reference to the message. For example, the System maintains a table that associates a user and all messages the user sent. Even after a message was permanently deleted—in case the message was ephemeral—information that indicates the association between the message and the user is stored and maintained.

At step 603, the process 600 notifies the Sender's web browser or client-side application that the message was already read by the Confirming Receiver. For example, the process 600 may send a read receipt to the Sender's web browser or client-side application. The Sender's web browser or client-side application may display an alert to show the read receipt. In one embodiment, if the number of Receivers is lower than a predetermined number (e.g., 5) and the message sent by the Sender to the Receivers is an ephemeral message, the Sender's web browser or client-side application removes the message from the display (or stops displaying the message) after receiving the read receipts from all Receivers. After step 603, the process 600 ends.

In one embodiment, the System maintains the total number of Receiver(s) (hereinafter "$T_r$") to whom it has sent the message and the total number of confirmation signal(s) (hereinafter "$T_c$") regarding the message it has received. Each time the process 600 receives such a confirmation signal, it will increase $T_c$ by 1. The process 600 may also periodically notify the Sender the percentage of Receivers who have read the message. This is a very useful and accurate tool for monitoring the effectiveness of advertising via instant messaging systems. For example, a merchant can send an advertisement message (for promoting a product or service) to a large number of users via this System. The System can accurately report how many users have read the advertisement so far. Furthermore, because each message has a unique ID, if a user forward the advertisement message to his/her friends via this System, the System will increase the total number of Receivers $T_r$ of the advertisement message accordingly. Thus, the System can also track and report how many times the advertisement message has been forwarded by other users—another indicator of how effective the advertisement is.

Figure 7:
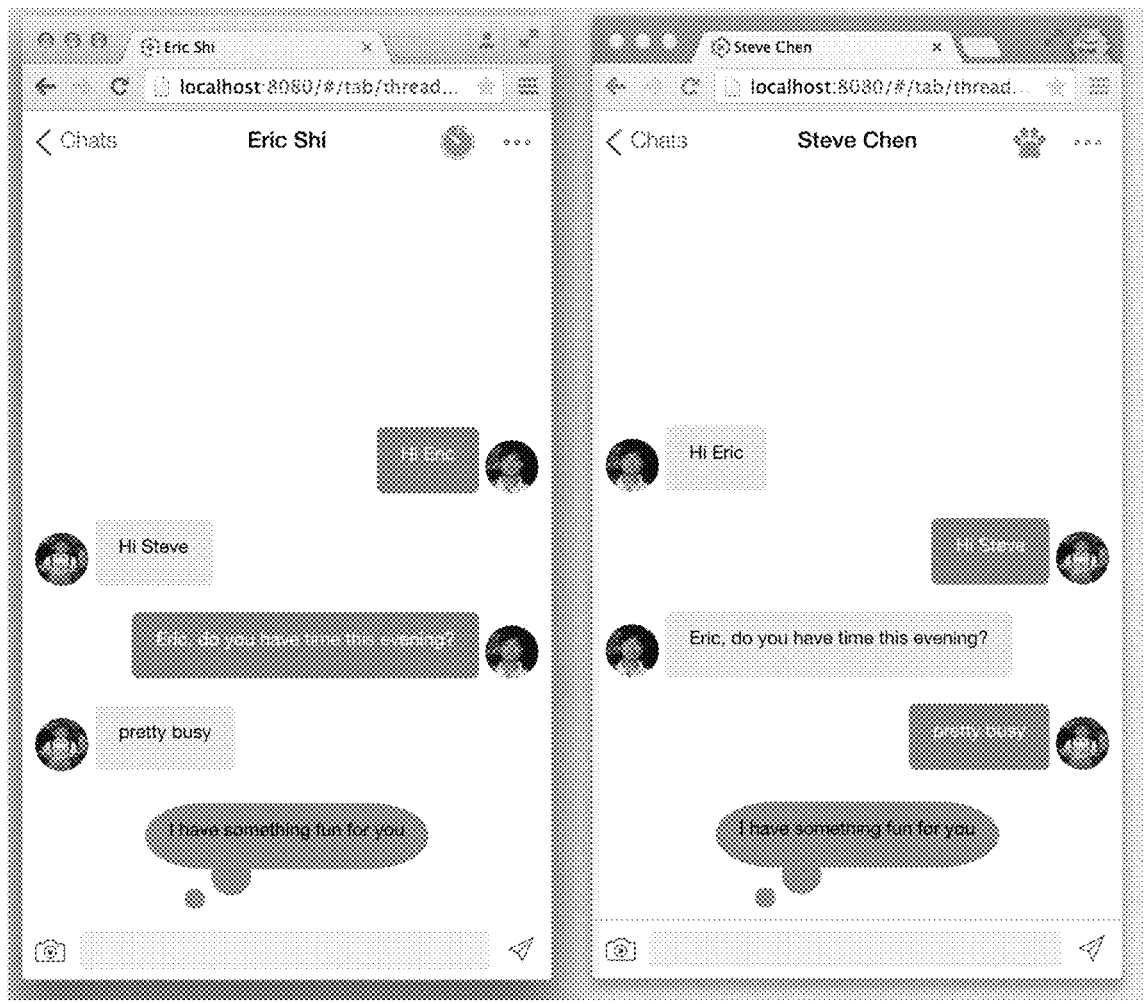
FIG. 7 shows two users communicating with each other via the electronic communication system, according to some embodiments of the present invention.

FIG. 7 shows that two users, Steve Chen and Eric Shi, are communicating with each other via the System. Currently, Steve Chen's web browser is set for ephemeral messaging mode (the upper right corner shows a clock icon), whereas Eric Shi's web browser is set for normal messaging mode (the upper right corner shows a footprint icon). Since Steve Chen's mode is ephemeral messaging, his message "I have something fun for you" to Eric is shown as an ephemeral message in Eric's web browser even though Eric's messaging mode is normal mode. Thus, a sender him/herself is eventually controlling whether his/her message should be ephemeral or not, not the receiver.

FIG. 7 also shows an example of displaying a disassociated message on user devices after Steve Chen clicked the icon on the upper right corner of his own device to request the system to protect his identity. Similarly, Eric Shi can start his identify protected messaging by clicking the icon on his own device. The icon flips between clock and footprint if it is clicked. The message display style of is common for users in the message thread in order to protect messenger identity. The message, "I have something fun for you", is displayed in the middle of the message thread, unlike other messages above it. Eric Shi and Steven Chen know its sender because the thread has only two persons, but there is no information to indicate who sent out the message for other persons and/or computer program. Eric or Steve can take a screenshot and share it with other persons and/or computer program, but the screenshot does not contain any information that shows who is the sender of this message. It thus discredits the screenshot. There are other methods to display disassociated message on screens of the message thread. For example, disassociated messages may be displayed in a common location on a screen of the message thread. Disassociated messages may also be displayed in random locations on the screen of the message thread.

In FIG. 7, the icon on the top right controls whether the message is in ephemeral mode or normal mode. In this example, ephemeral messaging mode and sender identity disassociation are combined. It is straightforward to disassociate sender identity and show message contents on user devices for a long time.

FIG. 8A and FIG. 8B show the visual cues that invite readers to fetch their original messages in text and image messaging use case, respectively. They also show examples of displaying disassociated dummy message, where the message sender identity is ambiguous to persons and/or computer program that are not in the conversation context. It thus discredits screenshots.

The methods make it possible for a messenger to share his/her thoughts or other knowledge without worrying about identity leaks via screenshots. It improves information sharing in electronic communication.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A method implemented on a user device for protecting message sender identity in an instant messaging system, the method comprising:
   receiving a message sent from a sender through a communication channel via the instant messaging system;
   determining if an ephemeral mode is selected by the sender;
   arranging a disassociated message by disassociating the message from the actual sender and/or a receiver of the message if it is determined that the ephemeral mode is selected by the sender;
   sending the disassociated message to the receiver through the communication channel; and
   displaying the disassociated message on user devices in a common style wherein screens of the user devices do not present information that indicates the sender of the disassociated message, including by displaying the dissociated message in a random location on the screen.

2. The method of claim 1, wherein the message can be includes a text, image, or audio.

3. The method of claim 1, wherein ephemeral mode is determined based on a command made by the sender.

4. The method of claim 1, wherein the disassociated message is displayed in a middle region of a message thread on the screen of the user devices.

5. The method of claim 1, wherein a disassociated dummy message displays on the screen of the user device to invite readers to get its original message content.

6. The method of claim 1 further comprising removing the message from the display after a predetermined period of time has passed since receiving a user action, wherein the user action comprises clicking, tapping, or swiping on a display.

7. The method of claim 1, wherein the user device is a personal computer.

8. The method of claim 1, wherein the user device is a mobile device.

9. A personal computing device comprising:
   a display;
   a memory for storing instructions; and
   a processor which, upon executing the instructions, performs a process comprising:
      receiving a message via the instant messaging system;
      determining if an ephemeral mode is selected by a sender;
      arranging a disassociated message by disassociating the message from the sender and/or a receiver of the message if it is determined that the ephemeral mode is selected by the sender;
      sending disassociated message to users in the same communication channel; and
      displaying disassociated message on computing devices in a common style wherein the devices do not present information that indicates the sender of the disassociated message, including by displaying the dissociated message in a random location on a screen.

10. The personal computing device of claim 9, wherein ephemeral mode is determined based on a command made by the sender.

11. The personal computing device of claim 9, wherein the message can be displayed in the middle of the message thread.

12. The personal computing device of claim 9, wherein a disassociated dummy message displays on computing device to invite readers to get its original message content.

13. The method of claim 9 further comprising removing the message from the display after a predetermined period of time has passed since receiving a user action, wherein the user action comprises clicking, tapping, or swiping on a display.

14. A non-transient computer readable medium programmed with computer readable code that upon execution by a processor of a mobile device causes the processor to:
   receiving a message via the instant messaging system;
   determine if an ephemeral mode is selected by a sender;
   arranging a disassociated message by disassociating the message from the sender and/or a receiver of the message if it is determined that the ephemeral mode is selected by the sender;
   sending disassociated message to users in the same communication channel; and
   displaying disassociated message on mobile devices in a common style wherein the devices do not present information indicates the sender of the disassociated message, including by displaying the dissociated message in a random location on a screen.

15. The non-transient computer readable medium of claim 14, wherein a disassociated dummy message displays on the mobile device to invite readers to get its original message content.

16. The non-transient computer readable medium of claim 14, wherein the message can be displayed in the middle of the message thread.

* * * * *